Nov. 6, 1951  R. F. McCONNELL ET AL  2,574,051
PLOW WHEEL AND MOUNTING
Filed May 26, 1948  2 SHEETS—SHEET 1
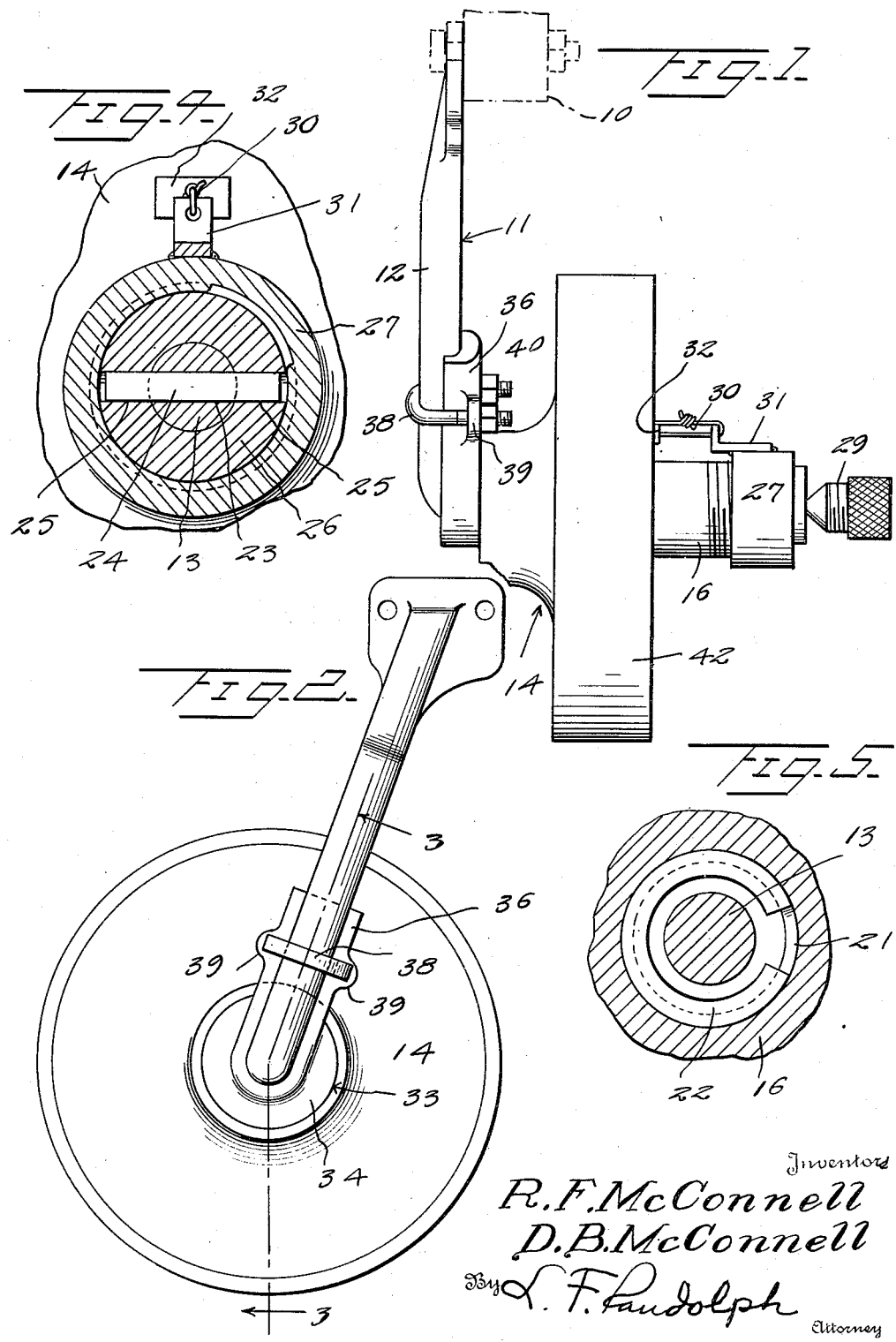
Inventors
R. F. McConnell
D. B. McConnell
By L. F. Randolph
Attorney

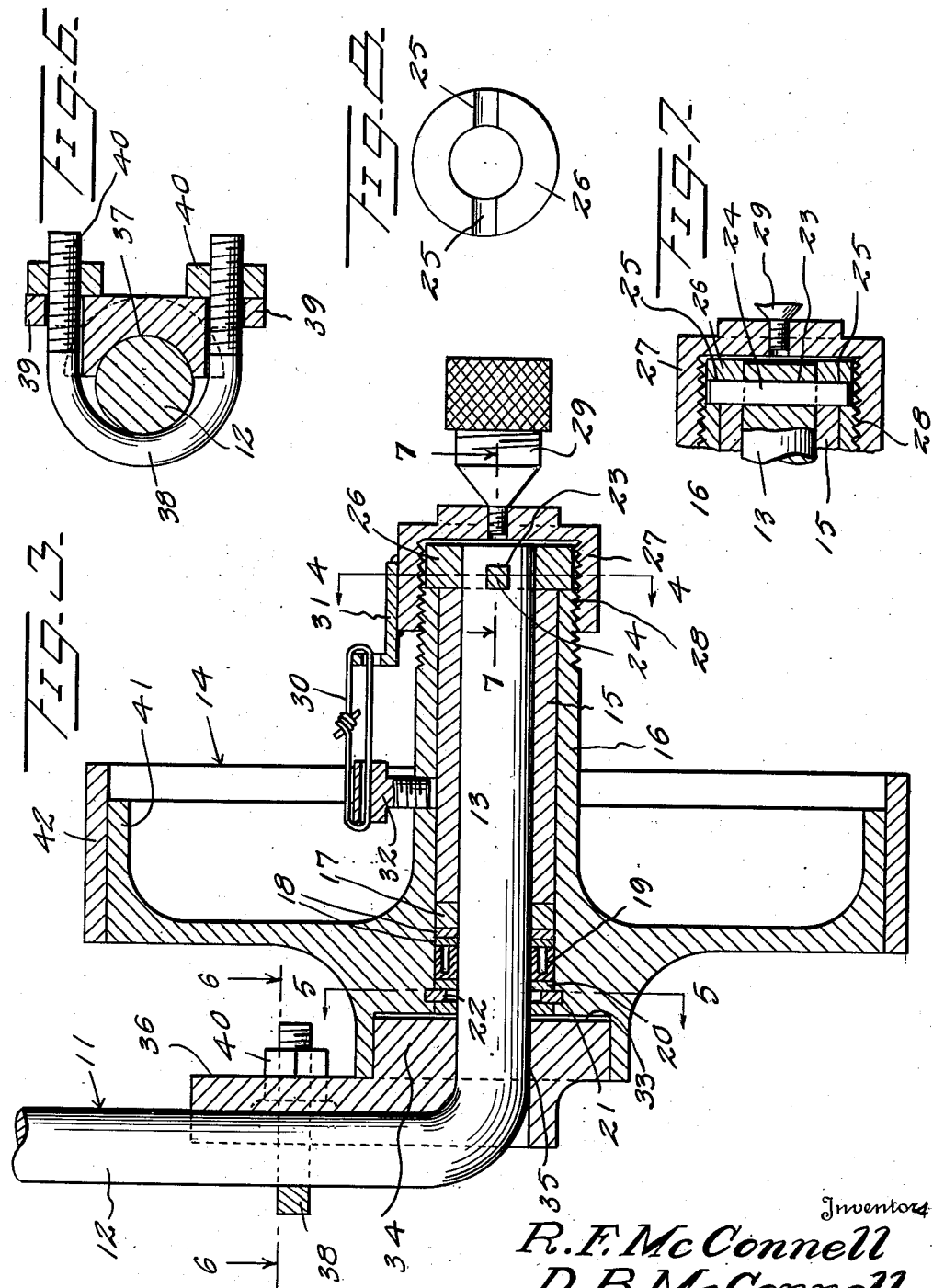

Patented Nov. 6, 1951

2,574,051

UNITED STATES PATENT OFFICE 2,574,051

PLOW WHEEL AND MOUNTING

Robert F. McConnell and Drusilla B. McConnell, Reedley, Calif.

Application May 26, 1948, Serial No. 29,298

2 Claims. (Cl. 301—111)

This invention relates to a wheel and mounting for use on certain types of heavy-duty farm plows, primarily.

It is particularly aimed to provide a novel structure which will reduce and minimize wear on the outside edge of the wheel due to severe use in certain types of sandy soil and wear caused by the wheel shaft, due to fine particles of sand and grit entering the shaft in loose soil.

The more specific objects and advantages will be inferred from a consideration of the description following taken in connection with accompanying drawings illustrating an operative embodiment.

In said drawings:

Figure 1 is a view in elevation showing the improved wheel and mounting;

Figure 2 is a view in elevation taken at a right angle to Figure 1 and looking from the left of the latter;

Figure 3 is an enlarged vertical section taken on the line 3—3 of Figure 2;

Figure 4 is a cross section taken on the line 4—4 of Figure 3;

Figure 5 is a section taken on the line 5—5 of Figure 3;

Figure 6 is a section taken on the line 6—6 of Figure 3;

Figure 7 is a detail section taken on the line 7—7 of Figure 3; and

Figure 8 is an elevation looking toward the inner surface of the ring-bearing employed.

Referring specifically to the drawings, 10 designates a conventional beam or part of a plow to which is connected a wheel-mounting bracket 11, in any suitable manner as by means of an arm 12 from which the wheel axle 13 extends at a right angle.

A ground wheel 14 is journaled on the shaft 13 preferably with a cylindrical bushing 15 interposed therebetween at a hub 16, the parts having a close fit to prevent the entrance of foreign matter.

At one end, to further prevent the entrance of foreign matter, I provide a number of washers or gaskets for instance the leather washer 17, metal washers 18, a rubber washer 19, preferably of cup form or U-shape in cross section so that it will be expanded by lubricant applied to the bearing, and a metallic washer at 20. The bore of the hub 16 has a continuous groove 21 around the same and fitted therein is a split expansible metallic washer or key 22, which serves to retain the washer assembly described in place against the adjacent end of the bushing 15 and effectively prevents the entrance of foreign matter to the journal.

At the other end of the hub, the axle 13 extends beyond the bushing 15 and has a diametric opening 23 therethrough which is occupied by a pin 24 of a length overlapping the ends of the bushing 15 and hub 16. Applied on the projecting end of the shaft 13 with diametric slots 25 receiving the ends of the pin 24, is a brass ring bearing 26.

An end cap 27 encloses the ring bearing 26 and prevents displacement of the pin 24 since the cap 27 is screw threaded as at 28 to the hub 16. The bearing may be lubricated through any conventional lubricant cup or pressure gun fitting 29 attached to the cap 27 as shown, the pressure of the lubricant and pressure against the same serving to expand the rubber packing 19.

The cap 27 is held against accidental turning as by means of a wire link 30 passed through an opening in a lug 31 fastened to the cap 27 and through an opening in a stud 32 screw threaded or otherwise attached to the hub 16.

It will be noted that the hub 16 at the left-hand end is enlarged to provide a recess 33 surrounding the shaft 13. Such recess is occupied by a supplemental collar 34 having a central opening 35 whereby it is strung on the shaft 13. From the collar 34 projects an extension 36 having a depressed surface 37 intimately fitting the arm 12 and the extension 36 is secured rigidly to such arm as by means of a U-bolt 38 passed through openings in lugs 39 on the extension 36 and being engaged by nuts 40 beyond the same.

It is also to be noted that the rim 41 of the wheel 14 has a supplemental rim 42 thereon which projects beyond the outside edge of rim 41. Such supplemental rim 42 is "sweated" in place on the rim 41, so that although it is rigid to turn with the wheel 14, it may be removed for replacement.

By reason of the provision of the supplemental rim 42, wear on the outside edge of the wheel due to severe use in certain types of sandy soil in particular, is minimized or overcome.

By reason of the particular mounting of the wheel on the shaft, most of the wear on such shaft, usually caused by fine particles of sand and dirt gaining entrance to the shaft in loose soil, is eliminated. The collar and extension 36 eliminates wear on the angle or elbow of the shaft 13 and its arm and greatly strengthens the structure generally.

Various changes may be resorted to provided

What we claim is:

1. In combination, a shaft for mounting on a plow, a wheel journaled on said shaft, said shaft being longer than the hub of said wheel, a pin extending through the shaft and overlapping and engaging against the outer end of said hub, a bearing ring fitted on said shaft and interfitted with said pin and engaging said outer end of the hub, an internally threaded cap surrounding said bearing ring and pin engaging around and threadedly and adjustably connected to the hub to seal the outer end of the shaft, a bushing between the hub and shaft, the inner end of the hub being recessed, and a collar clamped to the shaft and engaging in the recess to journal the inner end of the hub and, in combination with the cap and pin, preventing sliding movement of the hub on the shaft.

2. A plow wheel and mounting comprising an arm having an axle projecting laterally therefrom, a wheel having a hub journaled on the axle, a pin extending through the axle beyond the outer end of the hub and overlapping and engaging said end, a bearing ring carried by the axle having diametric inwardly opening recesses to receive the pin ends, said pin being of substantially the same length as the external diameter of the bearing ring, a cap having an interior diameter slightly greater than the exterior diameter of the bearing ring, detachably fastened to the hub and engaging over the bearing ring and pin and sealing the outer end of the journal of the wheel hub, the inner end of the hub being enlarged and recessed, sealing means disposed between the hub and axle adjacent the inner recessed end of the hub, a collar having an annular portion mounted on the axle and rotatably engaging in the recess of the inner end of the hub, said collar having an elongated portion of arcuate cross section fitting around a portion of the arm and disposed between the arm and wheel and against which a portion of the inner end of the hub bears for spacing the hub and wheel from said arm, and means detachably clamping said elongated collar portion against the arm.

ROBERT F. McCONNELL.
DRUSILLA B. McCONNELL.

REFERENCES CITED

The following references are of record in the file of this patent:

UNITED STATES PATENTS

| Number | Name | Date |
|---|---|---|
| 1,366,211 | Pratt | Jan. 18, 1921 |
| 1,515,940 | Edwards | Nov. 18, 1924 |
| 1,581,476 | Sanford | Apr. 20, 1926 |
| 1,725,918 | Henderson | Aug. 27, 1929 |